United States Patent [19]

Waineo et al.

[11] Patent Number: 5,483,241
[45] Date of Patent: Jan. 9, 1996

[54] PRECISION LOCATION OF AIRCRAFT USING RANGING

[75] Inventors: Douglas K. Waineo, Placentia; Henry F. Williams, Temecula, both of Calif.; Daniel E. Castleberry, Cedar Rapids, Iowa

[73] Assignee: Rockwell International Corporation, Seal Beach, Calif.

[21] Appl. No.: 239,795

[22] Filed: May 9, 1994

[51] Int. Cl.$^6$ .......................... G01S 13/72; G01S 13/76; G01S 13/91; G01S 13/93
[52] U.S. Cl. .................. 342/29; 342/33; 342/34; 342/36; 342/37; 342/125; 342/126
[58] Field of Search .................... 342/29, 30, 34, 342/33, 36, 37, 125, 126, 146

[56] References Cited

U.S. PATENT DOCUMENTS

| | | | |
|---|---|---|---|
| 3,653,769 | 4/1972 | Albright | 356/141.4 |
| 3,765,019 | 10/1973 | Kosowsky | 342/33 |
| 3,775,766 | 11/1973 | Gendreau et al. | 342/33 |
| 4,283,725 | 8/1981 | Chisholm | 342/174 |
| 4,398,195 | 8/1983 | Dano | 342/46 |
| 4,418,349 | 11/1983 | Hofgen et al. | 342/454 X |
| 4,429,312 | 1/1984 | Chisholm | 342/410 |
| 4,868,567 | 9/1989 | Eichweber | 340/953 |
| 4,888,590 | 12/1989 | Chase | 342/3 |
| 4,970,518 | 11/1990 | Cole, Jr. | 342/37 |
| 5,181,027 | 1/1993 | Shafer | 340/961 |
| 5,202,692 | 4/1993 | Huguenin et al. | 342/179 |
| 5,208,601 | 5/1993 | Hart | 342/33 |
| 5,375,058 | 12/1994 | Bass | 342/454 X |

*Primary Examiner*—John B. Sotomayor
*Attorney, Agent, or Firm*—George A. Montanye; Charles T. Silberberg; Tom Streeter

[57] ABSTRACT

A millimeter wave radar is placed on an aircraft and several radar targets are placed near a runway. The targets are discrete objects, each having a relatively localized radar cross section, a unique signature or a unique range bin, and a position which is accurately known. Targets should be spread over the length of the runway. Radar corner reflectors and active or passive repeaters are preferred. The locations of the radar targets with respect to the runway can be transmitted to the aircraft, or they can be stored on board. On board memory requirements can be reduced by requiring all airports to select one of only a few standard target placement patterns, or even only one. Targets are inexpensive, as are radars whose only precision requirement is in range, and not in azimuth or elevation angles. Range to at least three targets in the radar's field of view is all that is required for an on-board computer to determine the aircraft's location. A radar-generated image of the runway perimeter may be provided to the pilot, preferably in a heads-up display, with hazards superimposed in their proper relative positions. The runway edges need provide no radar contrast at all.

14 Claims, 4 Drawing Sheets

PRECISION LOCATION OF AIRCRAFT USING RANGING

BACKGROUND OF THE INVENTION

The present invention relates to precision location of aircraft, and has particular relation to such location when the aircraft is on or near a runway.

When an aircraft is far from a runway, it is unnecessary to know exactly (to within 30 cm.) where it is. It is necessary only to know that it is appropriately separated from other aircraft and from the ground. This separation may be on the order of several kilometers. However, such precise information is vital when taxiing, taking off, or (especially) landing, and information as to azimuth and elevation position relative to the runway approach path is most vital. This information is initially provided during aircraft approach to major hub airports by several overlapping ground based radars which are large, powerful, and precisely pointed. Primary guidance during the final approach is from the localizer (VHF frequency) and glide slope (UHF frequency) signals from the airport, which are subject to errors caused by local terrain and obstructions and often can't provide the required accuracy. The microwave landing system (MLS) is planned to be implemented to provide accurate guidance at all major airports, but this solution is uneconomical at smaller facilities.

SUMMARY OF THE INVENTION

A millimeter wave radar is placed on an aircraft and several radar targets are placed near a runway. The targets are discrete objects, each having a relatively localized radar cross section, a unique signature or a unique range bin, and a position which is accurately known relative to the runway. Targets should be spread over the length of the runway. Radar corner reflectors and active repeaters are preferred. The locations of the radar targets with respect to the runway can be transmitted to the aircraft, or they can be stored on board. On board memory requirements can be reduced by requiring all airports to select one of only a few standard target placement patterns, or even only one. Targets are inexpensive, as are radars whose only precision requirement is in range, and not in azimuth or elevation angles. Range to at least three targets in the radar's field of view is all that is required for an on-board computer to determine the aircraft's location. Using the measured position, a radar-generated image of the runway perimeter may be provided to the pilot, preferably in a heads-up display, with hazards superimposed in their proper relative positions. The runway edges need provide no radar contrast at all.

DETAIL DESCRIPTION OF THE DRAWINGS

Figure 1:
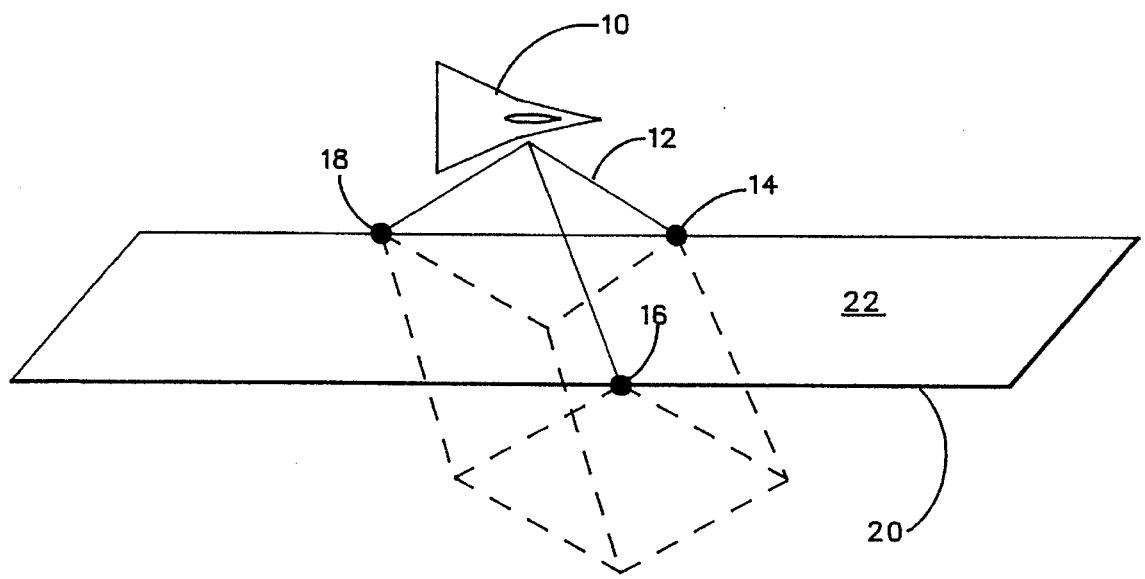
FIG. 1 shows a theoretically ideal configuration of aircraft, runway, and radar targets.

In FIG. 1, an aircraft 10 is located at a corner of an imaginary cube 12. Radar targets 14, 16, and 18 are located at the three neighboring corners of the cube 12, along the perimeter 20 of a runway 22. A radar aboard the aircraft 10 precisely measures the range to each of the targets 14–18, and a computer uses these ranges to calculate the position of the aircraft 10.

Figure 2:
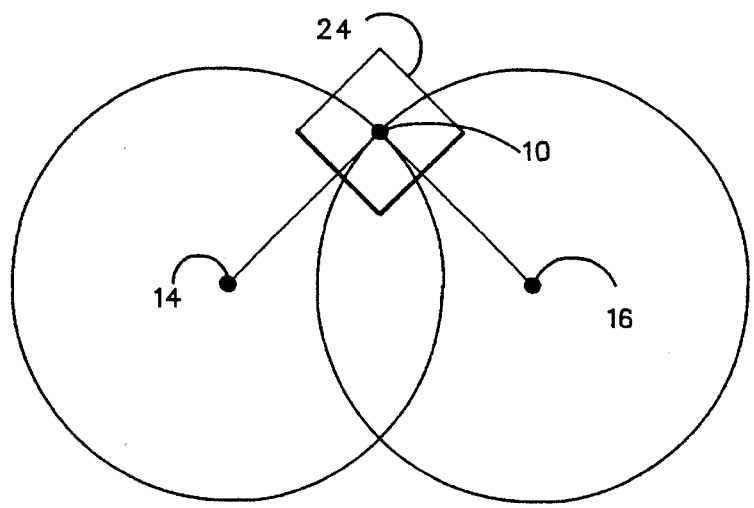
FIGS. 2–4 show the geometry behind the theoretical configuration of FIG. 1.
Figure 3:
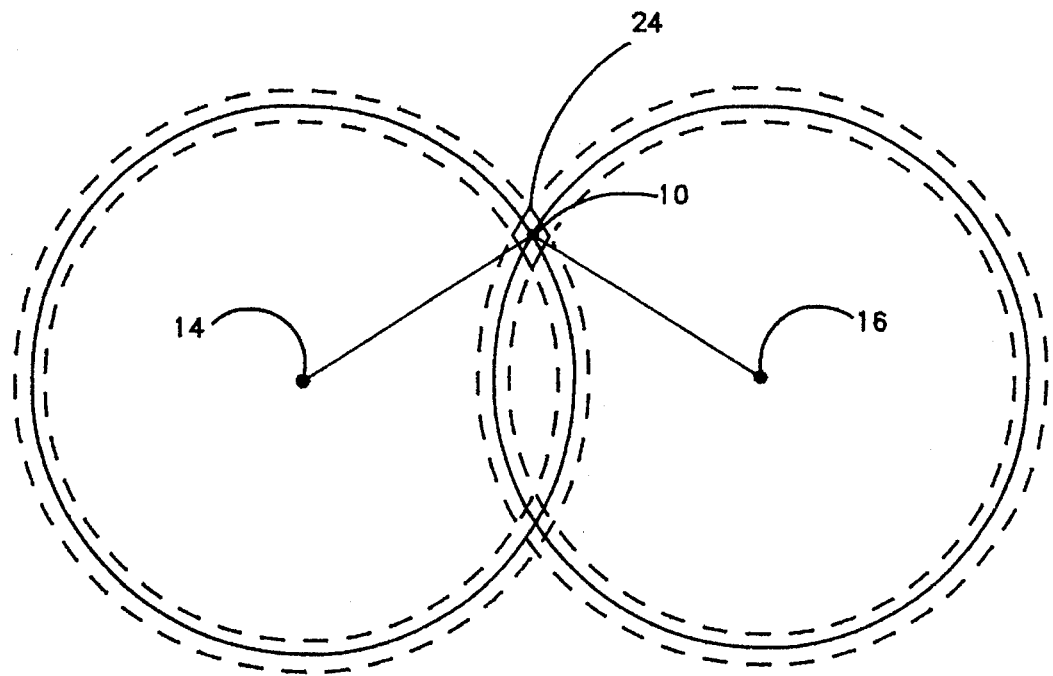
Figure 4:
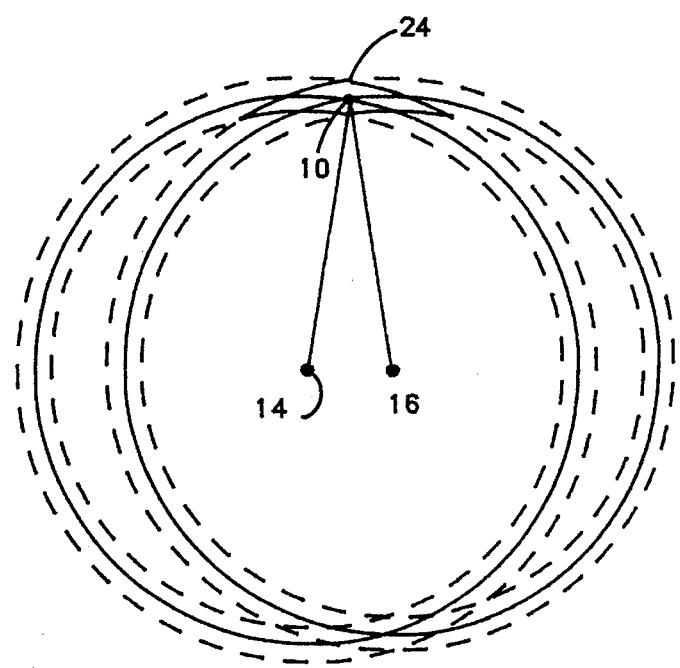

In FIG. 2, the aircraft 10 is located at a point whose bearing to first radar target 14 is at right angles to the bearing to second radar target 16. The area of uncertainty 24 is therefore fairly compact. This is not so when the angle between bearings is substantially greater than right angles, FIG. 3, or is substantially less, FIG. 4.

Figure 5:
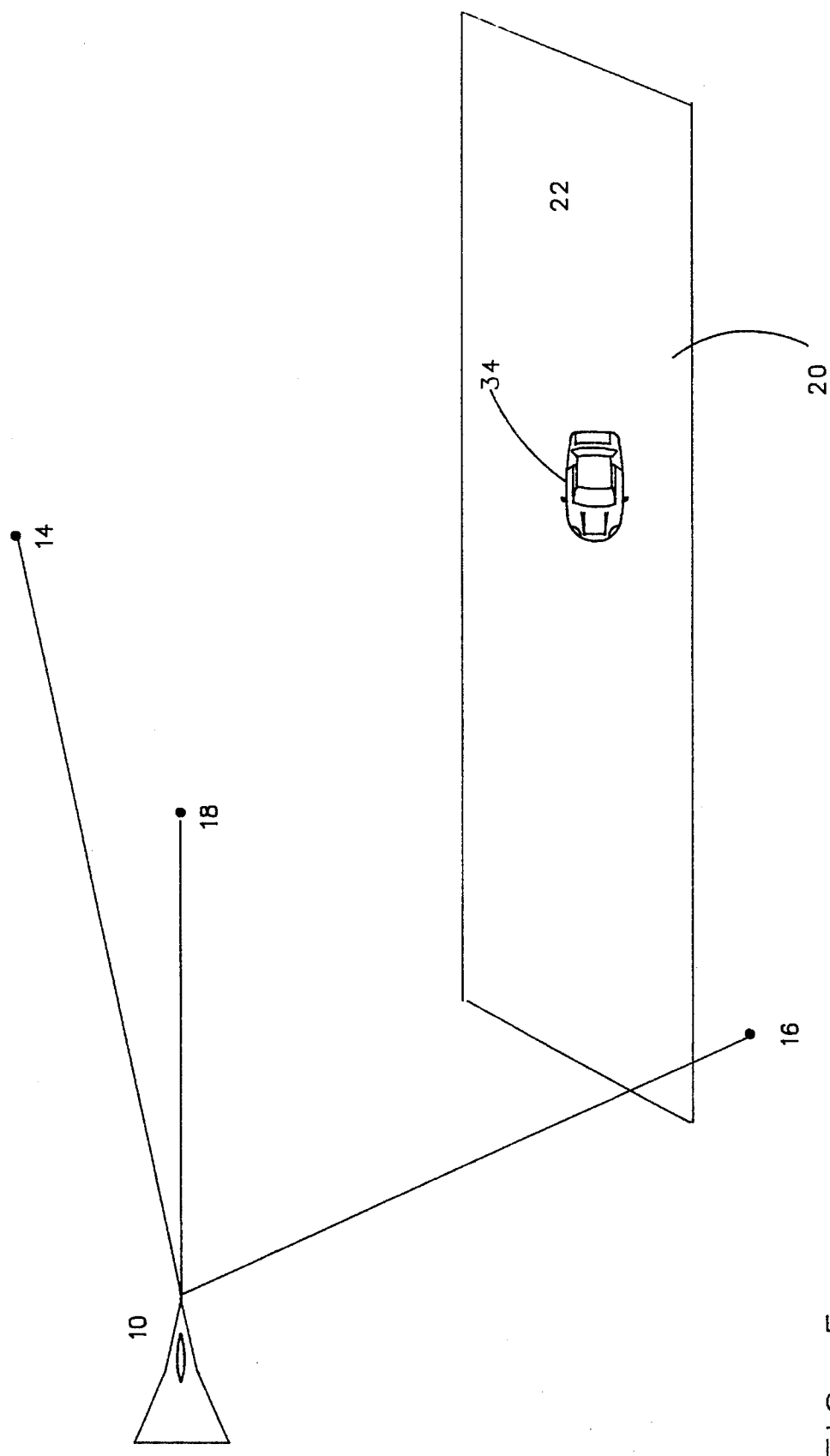
FIG. 5 shows a typical real configuration of aircraft, runway, and radar targets.

In FIG. 5, a more realistic placement of the radar targets 14–18 is shown. They are not on the perimeter 20 of the runway 22, but at varying distances beside it, and at varying elevations above (or below) it. Further, the radar in the aircraft 10 is located in the nose of the aircraft 10, and has a limited azimuth and elevation; it looks essentially forward rather than down or to the sides, as was shown in FIG. 1. The aircraft 10 therefore seeks radar targets whose bearings are fairly close to one another, i.e., at substantially less than right angles.

It is important that the radar on the aircraft 10 not be in the same geometric plane as is defined by the targets 14–18. If it is in the same geometric plane, then the location of the radar (and, hence, of the aircraft and of the aircraft's landing gear) can be accurately determined within the geometric plane, but even fairly extensive deviations from the geometric plane will go undetected. However, if the aircraft is in a normal descent along a 3 degree glide slope, height can be accurately estimated. It is important that some of the radar targets 14–18 be located at the near end of the runway and some at the far end so that height estimation is optimized. As noted, the minimum number of targets required is three but more targets in the scene increases the accuracy of the position estimate.

In some situations, such as during takeoff or while taxiing to a runway for takeoff, only the ground location is required, so as to assure that the aircraft is properly located on the taxiway or runway. In these situations, a network of radar targets is adequate even if they are all at ground level.

If the radar beam (which may be visualized as an edge of the cube 12) is sufficiently narrow, it will reflect from only a single radar target 14–18. "Reflect," as used herein, includes "activate an active or passive repeater." If it is broader (in azimuth, elevation, or both), it may reflect from two or more targets. In general, breadth of elevation should exceed breadth of azimuth, which should in turn exceed breadth of range. Multiple reflection is no problem if the targets are active repeaters with different signatures, but it is a problem if the targets are corner reflectors or if the repeaters have the same signatures. It is important that the target pattern be such that each target is uniquely identifiable.

This problem may be avoided by placing the targets in different range bins. A range bin is a window of range corresponding to window of time in the receiving mode, placed at a specified delay after the transmit mode, so that only targets in the window of range are detected. The targets are therefore preferably spaced apart from one another so that they may be individually detected when the aircraft's location is along the normal descent path. The presence of additional targets will provide position estimation when the aircraft is well off course, and also provide a self-checking feature since all range measurements will fall into a consistent pattern if the equipment is working properly.

Once the precise location has been determined, the angular spread of the targets increase later in the landing process. Also, estimation of the range to the various targets improves in accuracy as the landing process proceeds. This provides increasing precision as the aircraft gets closer to the runway.

In FIG. 5, target 16 is in a first, close, range bin, while target 18 is in a second, intermediate distance range bin, and target 14 is in a third, more distant range bin.

Figure 6:
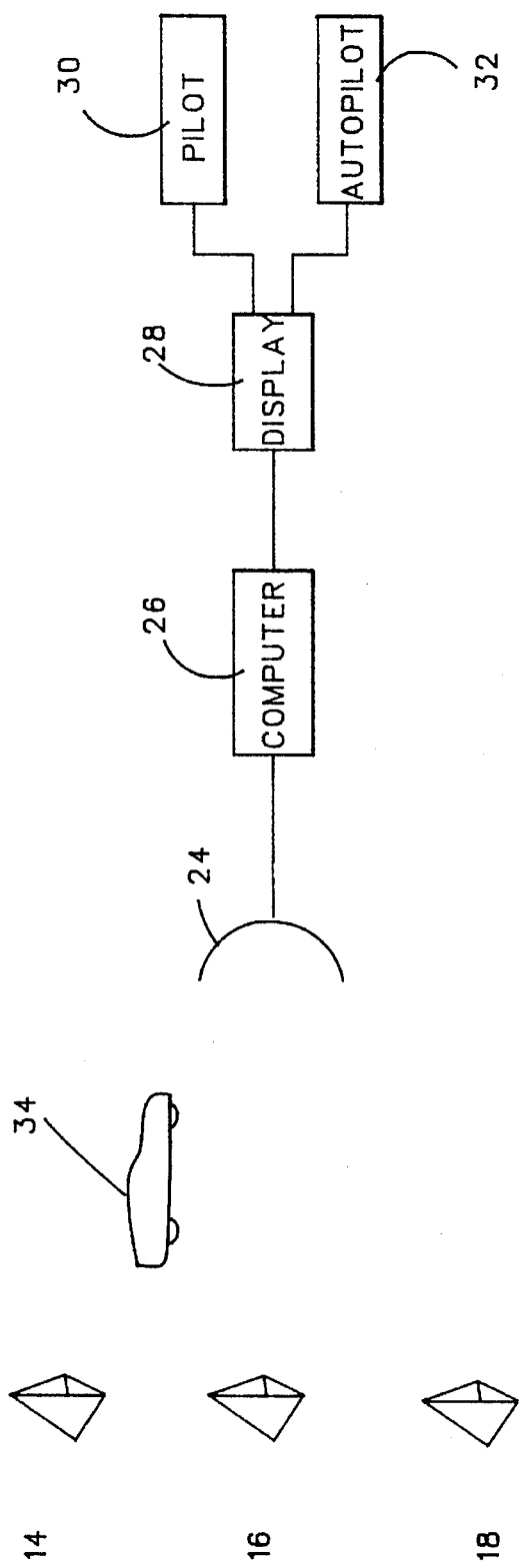
FIG. 6 is a block diagram of the present invention.

In FIG. 6, radar targets 14–18 reflect a beam from a radar 24. More than three targets may be used. An identification of each target, and of the range from the radar to the target, is produced by the radar 24 and is passed to a computer 26. The computer combines the ranges to each target with a knowledge of where the target is located with respect to the runway to calculate the location of the aircraft 10 (on which the radar 24 is borne) with respect to the runway. Target location knowledge may be internally stored or received from a ground station. The aircraft location is in turn passed to a display 28, which is viewed by an operator, such as a pilot 30, autopilot 32, or both. If an autopilot 32 is used, the display 28 may be as simple as a cable between the computer 26 and the autopilot 32.

The image shown to the pilot 30 by the display 28 may take any of a number of forms. It may show the aircraft's location with respect to the earth, the runway, or a desired flight path. It may be digital or graphic. If graphic, it may show a top plan view of the runway (or all of the airport's runways), together with the aircraft's location on the plan. This mode is desirable when taxiing. Alternatively, it may show a perspective image of the runway's (or runways') perimeter. This mode is particularly effective during landing when a heads-up display is used.

The radar 24 can do more than just precisely measure the range to the targets 14–18; it can also detect obstacles 34 on the runway 22. The azimuth and especially the elevation to the obstacle 34 will be less precise than the range to it, but at least its existence will be apparent. When the radar 24 detects a reflection which does not have the signature of a target 14–18, it notes that it is not a target 14–18 and passes this note to the computer 26, along with the (albeit approximate) azimuth, elevation, and range between the radar 24 and the obstacle 34. The computer 26 can then cause the display 28 to show the obstacle 34 to the pilot 30, preferably as an icon in a graphic image. If an autopilot 32 is used, the existence of an obstacle anywhere within the perimeter 20 of the runway 22 (including allowances for the imprecision of azimuth and elevation) is sufficient to allow the autopilot 32 to abort the landing.

INDUSTRIAL APPLICABILITY

The present invention is capable of exploitation in industry, and can be used, whenever an inexpensive and precise aircraft locator near a runway is desired. It can be made from components which, taken separate from one another, are entirely conventional, or it can be made from their non-conventional analogs.

While a particular embodiment of the present invention has been described in some detail, the true spirit and scope of the same are not limited thereto, but are limited only by the appended claims.

What is claimed is:

1. An apparatus for displaying the location of an aircraft with respect to a runway, wherein:

(i) the runway has at least three radar targets near it; and (ii) each target has a known location, in three dimensions, with respect to the runway;

the apparatus comprising:

(a) a radar on the aircraft, the radar being constructed to:
   (i) measure the distance from the aircraft to each of at least three of the radar targets; and
   (ii) produce an identification of each such target;

(b) a computer, the computer being constructed to:
   (i) receive target identifications and distance measurements from the radar; and
   (ii) calculate, from the target identifications and distance measurements, the location of the aircraft with respect to the runway in three dimensions; and (c) a display constructed to receive the location, in three dimensions, from the computer and to display the location to an operator.

2. The apparatus of claim 1, wherein the operator comprises an autopilot.

3. The apparatus of claim 1, wherein at least one of the radar targets comprises an active repeater.

4. The apparatus of claim 3, wherein:

(a) at least one active repeater has a unique signature; and (b) the identification of such repeater is produced from its signature.

5. The apparatus of claim 1, wherein at least one of the radar targets comprises a passive repeater.

6. The apparatus of claim 3, wherein:

(a) at least one passive repeater has a unique signature; and (b) the identification of such repeater is produced from its signature.

7. The apparatus of claim 1, wherein at least one of the radar targets comprises a radar corner reflector.

8. The apparatus of claim 1, wherein:

(a) each radar target is in a range bin; and (b) the identification of each radar target is produced by making a beam from the radar sufficiently narrow as to effectively reflect from only one radar target in each range bin.

9. The apparatus of claim 1, wherein the radar comprises a millimeter wave radar.

10. The apparatus of claim 1, wherein the display is constructed to produce an image of a perimeter of the runway.

11. The apparatus of claim 10, wherein the image of the runway perimeter is from the vantage point of the aircraft.

12. The apparatus of claim 10, wherein the image of the runway perimeter is a top plan view of the perimeter.

13. The apparatus of claim 10, wherein:

(a) the radar is constructed to discriminate between target reflections and reflections from non-target hazards; and (b) the computer is constructed to output an alert to the display if the hazard reflection appears to be within the runway perimeter.

14. The apparatus of claim 13, wherein:

(a) the alert comprises an estimated location of the hazard; and (b) the display is constructed to display a hazard image superimposed on the image of the runway perimeter, the hazard image and the runway perimeter image being in their proper relative positions.

* * * * *